March 3, 1959 H. G. FEISSEL 2,876,433

IMPULSE CIRCULATION COMPARISON DEVICE FOR TWO WHOLE NUMBERS

Filed Aug. 30, 1952 4 Sheets-Sheet 1

Inventor
HENRI GERARD FEISSEL
By:
Haseltine, Lake & Co.
Agents

March 3, 1959 H. G. FEISSEL 2,876,433

IMPULSE CIRCULATION COMPARISON DEVICE FOR TWO WHOLE NUMBERS

Filed Aug. 30, 1952 4 Sheets-Sheet 2

INVENTOR
HENRI GERARD FEISSEL
By:
Hazeltine, Lake & Co.
AGENTS

IMPULSE CIRCULATION COMPARISON DEVICE FOR TWO WHOLE NUMBERS

Filed Aug. 30, 1952 4 Sheets-Sheet 3

INVENTOR
HENRI GERARD FEISSEL
By: Haseltine, Lake & Co.
AGENTS

United States Patent Office 2,876,433

Patented Mar. 3, 1959

2,876,433

IMPULSE CIRCULATION COMPARISON DEVICE FOR TWO WHOLE NUMBERS

Henri Gérard Feissel, Paris, France, assignor to Compagnie des Machines Bull (Societe Anonyme), Paris, France Application August 30, 1952, Serial No. 307,325

Claims priority, application France September 24, 1951

2 Claims. (Cl. 340—149)

The object of the present invention is a comparison device for two whole numbers. For this comparison, each figure of these numbers is expressed in a particular system called semi-binary system, which generally results in the replacement of each of the numbers by a sum of terms chosen from the series 1, 2, 4, 8–10, 20, 40, 80–100 etc. so that each group of 4 digits corresponds to a given decimal order and so that the term of rank $(n+1)$ is represented by one or several terms chosen from the group $10^n$, $2{,}10^n$, $4{,}10^n$, $8{,}10^n$. The terms included in each of the sums are represented respectively by impulses called numerical of which the emission instants $t$, counted from a certain time origin, verify the relation $t=ar$, in which $a$ is a constant and $r$ the rank of the corresponding term in the aforementioned series.

According to the invention, the comparing device may be used in connection with a means which is connected to its output for the purpose of receiving an impulse at its output, when one of the two numbers to be compared is greater than the other. It may also allow the comparison to the digit one, of the successive digits of a certain number, and the furnishing of an impulse each time that one of these figures is equal to zero.

This comparing device especially includes a closed circuit for a cyclic circulation of impulses, called a memory or a storage system, the circulation time through which is equal to $a$, and which comprises an input, an output, and an impulse switching system. This comparing device is especially characterized by the fact that the input of the closed circuit referred to above, and the switching system are connected to two channels, each of which transmits the numerical impulses of a single number, these connections being so conceived that the complete travelling around the circuit is possible only for a single numerical impulse coming from a certain channel or for an impulse directly derived therefrom, that an impulse arriving singly by way of the other channel blocks all impulses which are circulating in the circuit, by the action of the said switching system, and that two numerical impulses arriving at the same time keep the said switching system closed without having access to the memory.

The main object of the invention is a device for comparing two whole numbers expressed in the form of coded impulses, which device includes a closed circuit, which is able to convey the electric impulses or ultrasonic waves which may be caused by these impulses in certain liquids, for example in a mercury line. This circuit, which includes an output channel and a switching system is connected to two input channels, of which each is associated with the numerical impulses of one of the numbers, so that under control of these impulses, an impulse may be obtained at the output of the circuit at the end of the emission of the numerical impulses, when one of the numbers which corresponds to a certain input channel is greater than the other.

Other features of the invention will be shown in the following description, and in the appended diagrams included by way of example.

Figure 1:
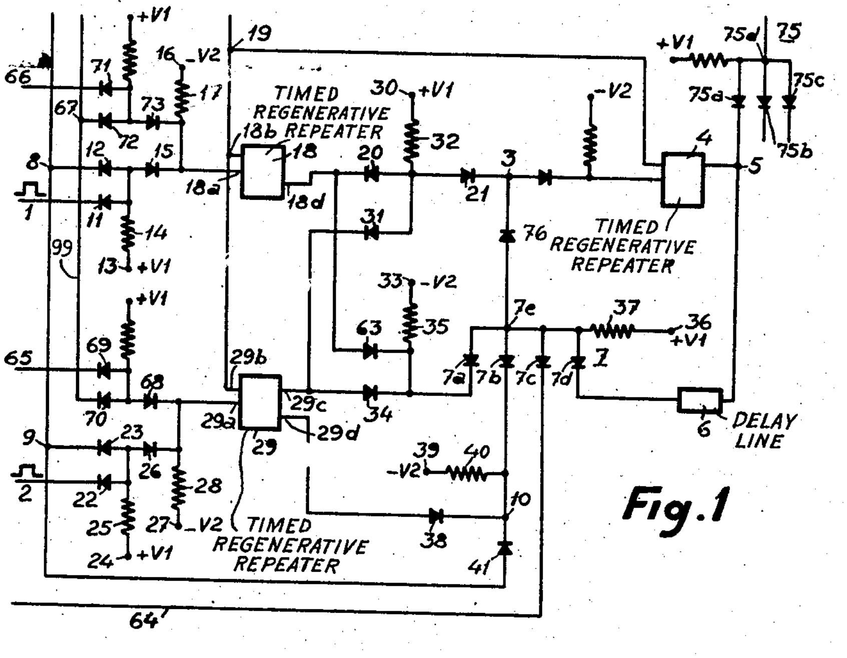
Fig. 1 shows a simplified diagram of a comparing device according to the invention.

The comparison circuit shown in Fig. 1 is described in the following, when a comparison between two whole numbers $N_1$ and $N_2$ greater than the digit one, but less than a certain maximum is wanted. This diagram will again be examined later on, when comparing the successive digits of a whole number $N_3$ to the digit one. In both cases, the positive numerical impulses corresponding to the first number $N_1$, arrive in the comparing device by way of channel 1 and the positive impulses which are of practically the same form, and represent the second number $N_2$, arrive by way of channel 2. These two channels are connected through the intermediary of impulse selecting means which will be described further on, to input 3 of a circuit forming a loop for a cyclic circulation of impulses 3, 4, 5, 6 and 7, and to electronic switch 7, inserted in this circuit between the principal aforementioned input and output 5 and placed in the return channel which the impulses follow when returning towards the input.

The circulation circuit includes an impulse repeater 4 and a retardation line 6, which are arranged so that an impulse entering the circuit at 3, returns to this input at the end of a time which is equal to the constant $a$, which figures in the equation $t=ar$ herein mentioned. The wiring diagram of the Figure 1 further comprises two buffers 84 and 85, two gates 83 and 86, and a timing regenerative repeater 18 which changes the polarity of the feeding pulses and has the logical function of a circuit "not."

Output 5 of circuit 3, 4, 5, 6, 7, is connected to input **75*a* of a switch 75, of which the operation will be described further on. This switch, by applying suitably chosen voltages at its inputs 75*b*, 75*c*, permits of receiving an impulse at its output 75*d*** only at the end of the comparison of the two numbers, and only when $N_2$ is greater than $N_1$.

The impulse selecting means which connect channels 1 and 2 to input 3 of circulation circuit or memory 3, 4, 5, 6, 7, are connected to a line 8, 9, 10, which is held at a zero voltage by means which are not shown in the diagram. These means may be made up of a commutator which allows for passing from this voltage to negative voltage $-V5$, when desiring to change over from the first to the second usage herein mentioned. The zero voltage is very neatly equal to the crest voltage of the positive impulses arriving by way of channel 1, which impulses have an amplitude equal to a value $V7$. These selective means which are of the same structure for each of the two channels, include for channel 1, in the impulse propagation direction, two practically identical rectifier elements 11 and 12, of which the inputs are connected to channel 1 and line 8, 9, 10 respectively. Their common outputs are connected to source 13, of a continuous voltage $+V1$ by a resistor 14, and also to input **18*a* of an impulse repeater 18, through a rectifier element 15, which is similar to elements 11 and 12, but is connected in the reverse direction. Input 18***a* is itself connected to a source 16, of negative potential −V2 through a resistor 17.

Another input 18*b* of the impulse repeater is connected to a line 19, 18*b*, 29*b*, called service returning line, on which positive retiming impulses circulate which have a repetition frequency equal to $$\frac{1}{a}$$

and which coincide with all the possible numerical impulses. The single output 18*d* of repeater 18 is connected to input 3 of the cyclic storage system through two rectifier elements 20 and 21 arranged in reverse directions.

The selective means concerning channel 2 also include, in the order in which they are met by the impulses coming from this channel, rectifier elements 22 and 23, which are similar to elements 11 and 12, and are arranged in the same way as them. Their inputs are connected to channel 2 and to line 8, 9, 10 respectively. Their common outputs are connected to a source 24 having a positive voltage +V1, through a resistor 25, and also to a rectifier element 26 arranged in the same way as aforementioned element 15. The output of this element 26 is connected to source 27, which has a negative potential −V2, through resistor 28, and to one of the inputs 29*a* of an inpulse repeater 29, which is similar to repeater 18.

The other input 29*b* of this repeater 29 is connected to line 19, 18*b*, 29*b*. These repeaters, the description of which will be given further on in connection with Fig. 2, generally include two outputs, which for the sake of simplicity will herein be called upper and lower. The upper output 29*c* of repeater 29 is connected to source 30 which has a positive potential +V1, through a rectifier element 31 and a resistor 32, and also to a source 33 having a negative potential −V2, through a rectifier element 34, and a resistor 35.

The outputs of rectifier elements 31 and 34 are on the other hand respectively connected to the output of rectifier element 20 herein mentioned, and to one of the inputs 7*a* of an electronic switch 7 which controls the impulses circulating in direction 4, 5, 6, along loop 3, 4, 5, 6, 7.

This interruptor 7, is made up of four practically identical rectifier elements which have a common input terminal 7*e*, for direct current, and of which the output terminals 7*a*, 7*b*, 7*c*, 7*d* form the inputs of the interruptor. Terminal 7*e*, which constitutes the output terminal for the impulses in circulation, is connected to a source 36, of a positive potential +V1, by a resistor 37. The lower output 29*d* of impulse repeater 29 is connected to another input 7*b* of interruptor 7 through the intermediary of a rectifier element 38. The output of this element is connected to a source 39, having a negative potential −V2, by a resistor 40, and also to extremity 10 of auxiliary line 8, 9, 10 herein mentioned through the intermediary of a rectifier element 41.

Arrangements similar to electronic interruptor 7, which are characterized by the fact that practically identical rectifier elements have the input terminals of direct current in common that direct current may flow in certain of them and inverse current may simultaneously flow in others have the same properties as switch 7. The units which are made up of the pairs of rectifier elements 11—12, 22—23, 20—31, are also therefore selectively controlled electronic switches which for purposes of simplification will hereinafter be known as gates.

Figure 2:
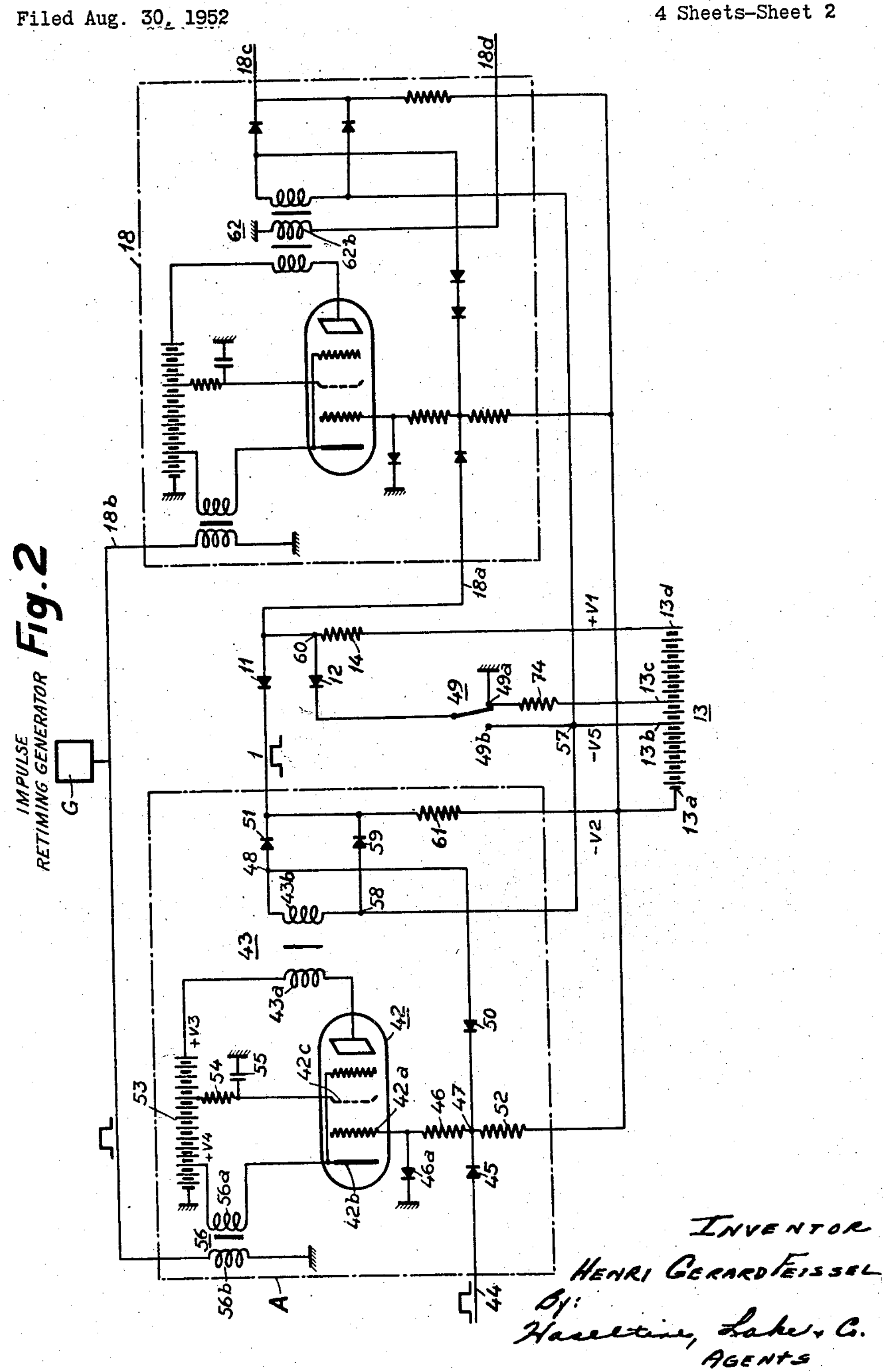
Fig. 2 shows the connection diagram of one of the impulse progressing channels in the comparing device and the impulse repeaters which are connected at both its extremities.

The operation of gate 11—12 will be explained in the following, with the support of Figures 2, 3 and 4. Fig. 2 represents the diagram of connections relative to channel 1, which transmits the impulses representing the number $N_1$, and to impulse repeaters A and 18, which are connected to its two extremities. These regenerators of nearly identical arrangement are bordered in the figure by two rectangles A and 18, drawn in dot-dash lines.

Impulse repeater A figures in the patent application filed in U. S. Serial No. 292,563 on June 9, 1952, now Patent No. 2,806,139. It essentially includes a pentode 42, of which the control grid 42*a*, which is biased below cut off, receives the positive numerical impulses to be regenerated, while its cathode 42*b* simultaneously receives negative freeing impulses. The numerical impulses received are reproduced in opposite polarity in the cathode-plate circuit of the pentode and transmitted in positive polarity to cell 11 of gate 11—12 by means of an output transformer 43, which includes a primary 43*a*, incorporated in this plate circuit, and a secondary 43*b*. Cell 12 is connected to battery 13 by means of the pivoting arm of a two position switch 49. In the position represented in the diagram, rectifier element 12 is connected to the ground and to intermediate connection 13*c*, by means of terminal 49*a*, and resistor 74 of high resistance. This element may also be connected to intermediate connection 13*b* of battery 13 by terminal 49*b*, the potential of connection 13*b* being −V5. The two rectifiers 11 and 12 are connected to positive terminal 13*d* of which the potential is +V1, of the aforementioned source, by resistor 14 which is of a very high value as compared to the value of the resistance of rectifiers 11 and 12. In Fig. 2 connections 49*a*, 74, 13*c* correspond to line 8, 9, 10, of Fig. 1 for the first manner of usage of the comparing device, and connections 49*a*, 57, 13*b* correspond to this same line of Fig. 1 in the second manner of usage of the comparing device, which will be considered further on. The distorted impulses to be reshaped and retimed, represented by U2, as plotted vs. time in Fig. 4 are transmitted by channel 44 (Fig. 2) and reach control grid 42*a* of the pentode through rectifier element 45 and resistor 46. Rectifier element 46*a*, which connects this grid to the ground is used as a voltage limiter. Terminal 47, which is common to this element 45 and to resistor 46 is itself connected to aforementioned winding 43*c* by means of connection 47—48, which includes a rectifier cell 50, and is also connected to negative terminal 13*a* of source 13, which terminal has a potential of −V2 by means of a resistor 52. The other extremity of winding 43*c* is connected to an intermediary connection 13*b* of this source, in such a way as to be brought to a potential of −V5, which is noticeably greater than −V2.

The cathode-plate circuit of pentode 42 includes source 53. Screen grid 42*c* is connected to it through a decoupling filter formed by resistor 54 and condenser 55. Cathode 42*b* of the pentode is connected to this source through the intermediary of secondary 56*a* of impulse transformer 56, of which primary 56*b*, fed by a pulse retiming generator G, receives positive retiming impulses. These impulses are transmitted to the cathode in the form of negative impulses of amplitude U1, which are represented in Fig. 4. By using rectifier elements of low resistance in the direct sense, for example germanium diodes of which the average characteristics are given in Fig. 3 as rectifier elements 45, 46*a*, 50, 51 and 59 and by giving the resistance of resistor 52 a very high value as compared with the resistance of three rectifiers, in the said sense the voltage of terminal 47 is very nearly equal to −V5, when in the absence of "distorted input" impulses, the voltage of input 44 is held equal to −V5.

Figure 3:
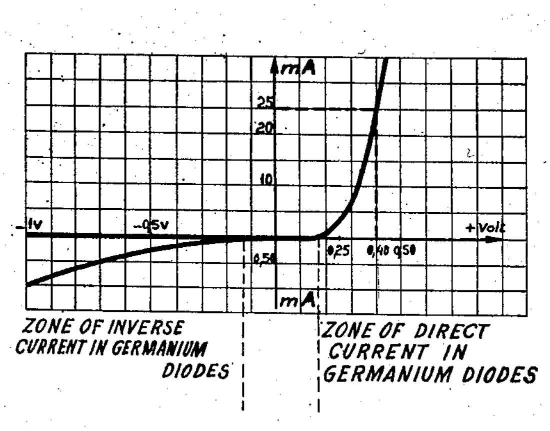
Fig. 3 is a graph showing the static characteristic curve of a germanium rectifier.
Figure 4:
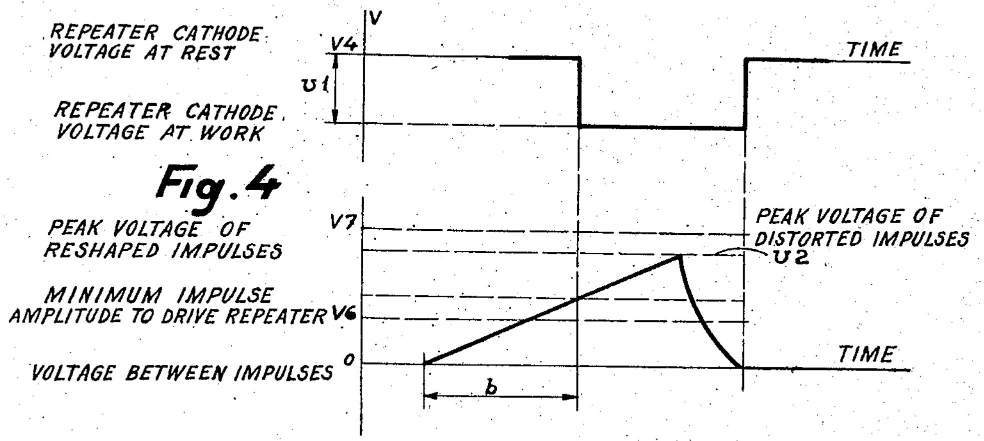
Fig. 4 shows the so-called "distorted" impulses and the retiming impulses represented vs. time.

It may be seen in Fig. 3, that for a difference in potential equal to 0.40 volt for example, an element of this type transmit a current of an intensity of 25 milliamperes. Its resistance is therefore equal to $$\frac{0.4}{0.025}=16 \text{ ohms}$$

The value of resistor 52 is around 50,000 ohms, so that the drop in voltage in element 50 is negligible as compared to the voltage drop in resistor 52. For the same reasons, the voltage drop in rectifier 51 is negligible as compared to the potential difference at the terminals of resistor 61 which connects this cell to negative terminal 13*a*. In the absence of numerical and of retiming impulses, the potential difference between control grid 42*a* and cathode 42*b*, practically equal to $-(V5+V4)$, is beneath the cut off value.

When a "distorted" impulse arrives at grid 42*a*, a time *b* before the corresponding timing impulse of an amplitude U1, the pentode remains blocked, and conducts if the amplitude of the impulse reaches or passes the threshold V6, which is well under amplitude V7 of the regenerated impulse, and when simultaneously the cathode voltage becomes practically equal to $(+V4-U1)$, as a result of the timing impulse. The feedback network (57, 58, 43*b*, 50, 47, 46, 42*a*) is designed for holding the control grid at an absolute voltage at least equal to $(+V6-V5)$ during the length of this retiming impulse.

The positive impulse created in secondary winding 43*b* and which has an amplitude V7 practically equal to V5, brings channel 1 which was formerly at a potential $-V5$, to a potential slightly above zero. Rectifier element 59 and resistor 74 then prevent the short circuiting of winding 43*b*, either by circuit 48, 51, 59, 58, or by circuit 48, 51, 11, 60, 49, 74, 13*c*, 13*b*, 57, 58. The voltage at extremity 60 of resistor 14, then suddenly increases from $-V5$ to a value very near to zero, since the resistance of rectifier 12, which was formerly much higher than that of rectifier 11 due to its passing an inverse current, again becomes practically equal to the resistance of the latter rectifier, since this time direct current passes therethrough. A positive impulse developed in transformer 43 is thereby transmitted to impulse regenerative repeater 18 through input 18*a*, the arrangement of this regenerator differing from that of regenerative repeater A only in that a second secondary winding 62*b* of transformer 62 is used for furnishing a negative output impulse at output 18*d*. A positive impulse could also be obtained at 18*c*.

The examination of Fig. 1 will now explain the operation of the comparing device. Line 8—9—10 being at zero potential, and line 99 at a potential $-V5$, it will be shown in the following that if the number $N_2$ is greater than $N_1$, a positive impulse will always be obtained at 5, at the end of the comparison of the two numbers, while no impulse is obtained if $N_2$ is equal or less than $N_1$. Among the various cases possible, the four following ones, which concern the last decimal figures on the right of the numbers $N_1$ and $N_2$ will now be examined:

(A) The first figure on the right $n_1$ of number $N_1$ is even, while the first figure on the right $n_2$ of $N_2$ is odd, so that the first numerical impulse arriving in the comparing device is led there by channel 2.

(B) The figure $n_1$ is odd, figure $n_2$ is even so that this first impulse is led by channel 1.

(C) Figure $n_1$ is even and $n_2$ is equal to one, so that the first impulse arriving by channel 2 is followed before the end of the first decimal period, by at least one impulse arriving by channel 1.

(D) Figures $n_1$ and $n_2$ are equal.

In the first case, the first numerical impulse passes through rectifier cell 22 of gate 22—23, in accordance with what has already been explained concerning gate 11—12. This impulse is then transmitted to repeater 29 by rectifier 26, which regenerates it with a delay "*c*," which is less than time interval "*a*" herein defined.

The negative impulse provided by output 29*d*, having an amplitude which is practically equal to $-V5$, is blocked by rectifier cell 38 which is crossed by an inverse current which is acutally negligible.

The positive impulse, of a crest voltage practically equal to zero, issuing from output 29*c*, passes through rectifier element 31 of gate 20—31, because output 18*d* is at a zero potential.

This impulse penetrates into the storage system 3, 4, 5, 6, 7. It is regenerated in regenerator 4, with a new "*c*" delay, then crosses delay line 6 in a time *d*, so that $c+d=a$ and circulates in the cyclic storage system indefinitely, as long as it is not blocked by gate 7.

In the second case, the first impulse passes through gate 11—12, rectifier 15, and penetrates into repeater 18. This regenerator provides a negative impulse at its output 18*d*, which brings it to the same voltage $-V5$ as output 29*c* of regenerator 29, and leaves in two directions.

In one of these directions, it passes through gate 20—31, and penetrates the cyclic storage system through its input 3. It holds the pentode of repeater 4 beneath the cut-off, and is therefore not transferred by it.

In the other direction, the negative impulse passes through gate 63—34 and does not change the potential of input 7*a* of gate 7, which was previously equal to potential $-V5$ of output 29*c* of repeater 29. Gate 7 therefore blocks a positive impulse arriving at the same instant by input 7*d*.

In the third case, the first numerical impulse arriving by way of channel 2 is followed at the end of a certain time which is at most equal to 3*a*, by another positive numerical impulse arriving by way of channel 1. As in the second case, a reshaped and retimed negative impulse reaches gate 7 at the same time as the impulse put into circulation in the aforementioned cyclic storage system by the first numerical impulse. Gate 7 therefore blocks this circulating impulse, and as in the second case, the negative impulse provided by regenerator 18 is not able to penetrate into the cyclic storage system.

At the end of the comparison of $n_1$ and $n_2$, there will therefore be no impulse in the cyclic storage system.

In the fourth case, the impulses arriving simultaneously by way of channels 1 and 2 are reshaped and retimed by repeaters 18 and 29 respectively. Each positive impulse issuing from output 29*c* of repeater 29 is blocked by gate 20—31, of which the single output is brought to potential $-V5$ by the simultaneous negative impulse issuing from repeater 18.

The aforementioned positive impulse, furthermore reaches input 7*a* of gate 7 through rectifier cell 34, and if a positive impulse is then in circulation in the cyclic memory, it arrives at the same instant at input 7*d* of the gate, and passes through this latter, since its other inputs 7*b* and 7*c* are held at a zero potential.

Finally, if the figure $n_2$ is greater than figure $n_1$, a positive impulse will always be obtained at output 5 of the cyclic memory, at the end of the first decimal period. This impulse may be blocked during the following decimal periods, but it is evident that if number $N_2$ is greater than $N_1$, a positive impulse will finally, as has already been stated, be obtained at 5, at the end of the last decimal period of the comparison of the two numbers. The sending of a negative impulse into channel 64—7*c*, at the instant when the final impulse reaches gate 7, allows for the blocking of it, and for the resetting of the comparing device to zero, before beginning a new comparison. By providing inputs 75*b* and 75*c* with potentials near to zero only at the instant when the final impulse passes at 5, this impulse is able to pass gate 75, and the passage is blocked for it at the end of the other decimal periods.

By means of certain modifications, and by leading the numerical impulses through channels 65 and 66, the comparing device herein mentioned permits the comparison to one of the successive figures of a given number $N_3$, and the obtaining of an impulse at 5, when one of these figures is equal to zero. In order to bring about this comparison an impulse of a value of one, called a comparison impulse is sent into channel 65, at the beginning of each of the numerical impulse emitting decimal periods, each of these periods corresponding to one of the figures of the increasing decimal orders of the number $N_3$. The binary impulses representing the digits of this number then arrive in the comparing device by way of channel 66, so that all impulses of a value $10^n$, when $n$ is one of the decimal orders of this number, coincide with a comparison impulse. Each decimal period is equal to four binary periods $a$, this term representing the time interval elapsing between the emissions of two impulses having the values $2^q$ and $2^{q+1}$ respectively, $q$ being at most equal to 2.

Auxiliary line 99 is then at a zero potential line 8—9—10 at a potential −V5 and line 64—7c is also at a zero potential. In Fig. 2, where line 8—9—10 corresponds to the connection which joins switch 49 to source 13, the passage of this connection to potential −V5 is obtained by putting the switch arm on stud 49b.

If the units figure of number $N_3$ is even, a comparison impulse arrives alone in the comparing device by way of channel 65 at the beginning $t_0$ of the first decimal period, it passes through gate 69—70, rectifier 68, and penetrates into repeater 29. By its output 29c, this latter delivers a positive impulse at instant $(t_0+b)$, which impulse is transmitted in two directions. This impulse reaches rectifier cell 31 of gate 20—31, which allows its passage, since output 18d of repeater 18 is at a zero potential, and penetrates into circulation loop 3, 4, 5, 6, 7, by its input 3. The same impulse also reaches input 7a of gate 7. The negative impulse issuing from 29d passes through rectifier 38 and reaches input 7b of gate 7. Inputs 7b and 7d of this latter are therefore negative, while its inputs 7a and 7c are positive. Gate 7 therefore blocks the positive impulse coming from 29c.

If the figure of the second decimal order of the number $N_3$ is even, and its first figure equal to zero, an impulse is in circulation in cyclic memory 3, 4, 5, 6, 7 at the beginning $t_1$ of the second decimal period. The two impulses coming from repeater 29 follow the paths herein outlined, so that at the moment when the impulse in circulation reaches gate 7, it is blocked by this gate. A positive impulse is however put into circulation in the cyclic memory at the same instant.

It is therefore evident that each comparison impulse resets the comparing device to zero, the result of the preceding comparison notwithstanding.

If at the beginning $t_n$ of a decimal period of rank $n$ greater than one, a numerical impulse of value $10^n$ penetrates into the comparing device, this impulse passes through gate 71, 72, rectifier 73, and penetrates into repeater 18. This latter delivers a negative impulse at instant $(t_n+b)$, by its output 18d, so that the positive impulse coming from output 29c of repeater 29, at the same instant, is blocked by gate 20—31.

If the digit of rank $n$ of the number $N_3$ is for example equal to eight, the numerical impulse of value $8\times10^{n-1}$, will penetrate into repeater 18 at instant $(t_n+3a)$. This repeater will provide a negative impulse at instant $(t_n+3a+b)$ by its output 18d. This impulse will pass through rectifier 63 and will reach input 7a of gate 7, while the positive impulse which had been set in circulation in cyclic memory 3, 4, 5, 6, 7 by the comparison impulse at instant $(t_n+b)$, will reach input 7d of the same gate. This impulse will therefore be stopped by the gate.

It is therefore seen that at the end of each decimal period, a positive impulse will pass output 5 of cyclic storage system 3, 4, 5, 6, 7 only, if the corresponding digit of number $N_3$ is equal to zero. This impulse will be obtained at output 75d of gate 75 by applying positive impulses at its inputs 75b and 75c which impulses have a repetition frequency equal to one decimal period.

It goes without saying that the invention shall not be restricted to the manner of realization herein described and outlined in the drawings. With the comparing device according to the invention, it is especially possible to compare not only two whole numbers $N_1$ and $N_2$ which include $n_1$ and $n_2$ figures respectively, but also the numbers obtained through the cancelling in these two numbers of all figures situated to the left of the digits of rank $n_3$, $n_3$ being less than $n_1$ and $n_2$ in order to effect rounded-off operations. To effect a comparison before such operations, it is merely necessary to block gate 7 and the gates controlling inputs 18a and 29 for impulses to be generated, starting from the decimal period of rank $n_3+1$. This blocking may be accomplished by means of lines 64—7c, 8—9—10 and 99.

In like manner, the replacing of germanium cells by electronic discharge tubes of a low interior resistance, changes nothing in the operation of the comparing device.

Finally, gate 7 may be arranged between regenerator 4 and output 5 of the memory without departing from the limits of the invention. This output is then joined with terminal 7e of the gate, which terminal is normally at the same potential, −V5 as the aforementioned output.

Figure 5:
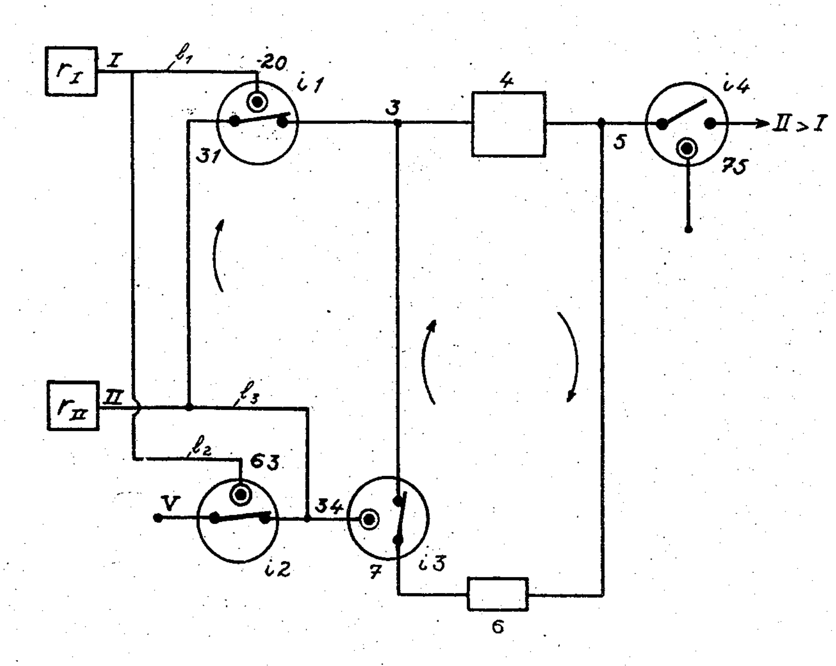
Fig. 5 shows a schematic diagram of a comparing device according to the invention.

It is worth noting that the operation of the abovementioned comparing device may be illustrated in a very simplified form, by the schematic diagram shown in Fig. 5, which includes switches for realizing the described circuits. These switches open or close, according to the switch, under the action of a suitable voltage (for example, switch *i1* opens, upon application at 20 of a voltage); these switches are shown in the rest position (except for *i3* which is assumed to be normally energized and closed by a constant voltage applied to terminal V; accordingly *i3* is represented in the closed position in Fig. 5), *r*I and *r*II are selective distributing devices of impulses adapted either to the first or to the second of the main functions of the present invention as described hereinbefore. The cyclic memory 3, 4, 5, 6 and 7 (3, 4, 5, 6 and 7 being adapted for the same functions as 3, 4, 5, 6 and 7 of Fig. 1) stores one impulse, through II, *i1* and 3, when *r*II alone transmits a impulse; if there is an impulse previously stored in the memory, delay line 6 is so built as to insure the coincidence of the incident and stored impulses, the switch i3 remaining closed under the control of V through i2. The same memory does not receive an impulse when *r*I alone transmits an impulse owing to the opening of switch *i1*; if there is an impulse stored in the cyclic memory, this impulse is cancelled by switch *i3*, *i2* being opened by *r*I through connection *l2*. When both *r*I and *r*II transmit an impulse respectively through connections I and II, no impulse reach the cyclic memory for owing to the action of the impulse travelling along the connections *l1* and *l2* the switches *i1* and *i2* are opened; accordingly the memory switch *i3* is closed as above and, if there is an impulse stored in the memory, this impulse is not cancelled. It is obvious that if, at a characteristic instant, for which *r*I and *r*II can transmit impulses, both *r*I and *r*II do not transmit any impulse there is no change in the state of the memory.

So, in comparing each figure of two numbers, each of these figures being represented by one or a plurality of impulses, each impulse representing a digit of which the rank in time is representative of its value, said value increasing progressively in respect to time in such a manner that each digit is superior in value to the sum of the values of the previous digits, it is easy to see from the above explanations that, if and only if the last impulse of *r*II relative to a figure is transmitted towards the memory after the impulse relative to the corresponding figure for rI an impulse is stored in the memory, indicating that the figure represented by the impulses delivered by *r*II is greater than the figure represented by the impulses delivered by rI.

In following the increasing orders of the figures of the two numbers, there are three possibilities: there is no impulse stored in the memory and the operation of the circuit is the same as above, order by order; there is one impulse stored in the memory and the first impulse for an order is delivered by *r*I, the previously stored impulse is cancelled; there is one impulse stored in the memory and the first impulse for an order is delivered by *r*II, the previously stored impulse is not cancelled. Thus, it appears clear that, after the last digit of the last order, if and only if there is an impulse stored in the memory the number represented by the impulses delivered by rII is greater than the number represented by the impulses delivered by rI. The final state of the memory is detected by a potential applied to the control element of switch i4, closing that switch to indicate on the output of said switch that an impulse is circulating in the memory. The resetting of the memory can be done by cutting the potential on terminal V.

To verify which are the figures of a number which are equal to zero, rII transmits one impulse for each possible impulse of rI which can be representative of the digits of a figure of this number. It appears clear that if and only if there is an impulse stored in the memory, when the time elapsed corresponds to the time necessary to the transmission of the possible impulses of rI for said figure, that said figure is equal to zero. This is then verified by the way of i4 in the same manner as above and the resetting of the memory is also the same.

Figure 6:
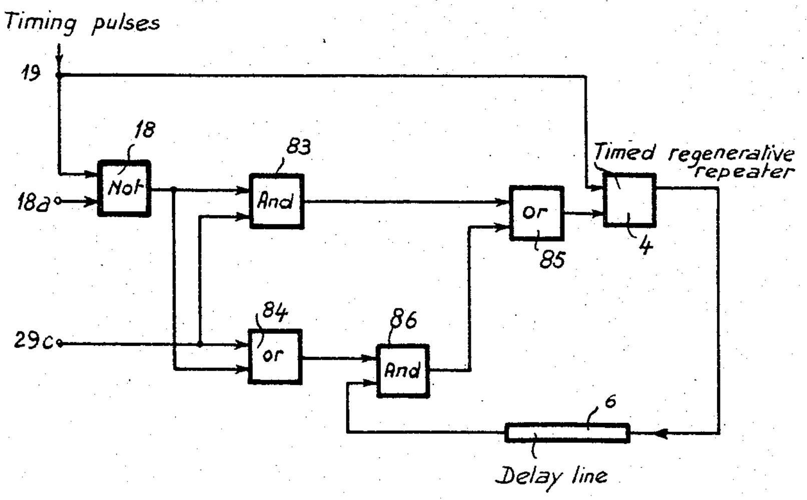
Figure 6 shows a diagram of the logical functions of a comparing device according to the invention.

For rounding-off numbers to be compared (i. e. to neglect a number of the lowest orders of the two numbers) the potential on terminal V is to be applied only when the first compared order of each number begins to act on rI and rII. The device drawn on the Figure 1 may be illustrated in another simplified form by the block-diagram of the Figure 6. The logical circuits "and," "or" and "not" are well known in the technique (see, for instance, the book "High Speed Computing Devices" by Tompkins and Wakelin, McGraw-Hill—1950—page 271). The logical circuits "and" and "or" are also called gate and buffer. A logical circuit "not" 18 also called "complementing circuit" provides to its output a signal of opposite polarity with regard to the input signal. The pulse trains representing the binary numbers to be compared are applied to the terminals **18*a* and 29*c*. Timing pulses are applied to the circuits 4 and 18. It is apparent that such a device, if allowing a comparison of impulses representing numerical values according to the so called semi-binary system 1, 2, 4, 8, 10, 20, 40, 80, 100 etc. to represent decimal numbers, also allows the comparison of coded impulses according to other systems, and especially in the pure binary system and numbers: 1, 2, 4, 8, 16, 32**, etc.

The comparing device herein described may be used in electronic accounting machines, and especially in machines making use of perforated cards.

I claim:

1. In a comparison device for comparing the decimal values of a first and a second binary number, a first and a second timing pulse generator, a cyclic line storage with an input and an output including a timed regenerative repeater connected to said first timing pulse generator and a delay line, a pair of pulse input conductors comprising a first and a second lead carrying two pulse trains representing said binary numbers in which the digit 1 is represented by a pulse and the digit 0 by an absence of pulse, a first gating circuit the inputs of which are connected to said leads and the output of which is connected to the input of said cyclic line storage, this said first gating circuit being adapted for carrying a pulse in said cyclic line storage when said second lead only is energized, a second gating circuit the inputs of which are connected to said leads and to the output of said cyclic line storage and the output of which is connected to the input of said cyclic line storage, this second gating circuit being adapted for cancelling a pulse circulating in said line storage when said first lead only is energized, an output gating circuit connected to said cyclic line storage and to said second pulse generator, said output gating circuit generating at least one pulse after the end of the comparison operation when the decimal value of the first binary number is lower than that of the second binary number.

2. In a comparison device for two binary numbers each represented by a pulse train comprising a first and a second lead fed by said pulse trains, a complementing circuit the input of which is connected to said first lead, this circuit reversing the polarity of the input pulse train, a first gate the inputs of which are connected to the output of said complementing circuit and to said second lead, a first buffer the inputs of which are connected to the output of said complementing circuit and to said second lead, a cyclic line storage member including a timed regenerating repeater and a delay line provided with an input and an output, a second gate the inputs of which are connected to the output of said line storage member and to the output of said first buffer, a second buffer the inputs of which are connected to the output of said first gate and said second gate, the output of said second buffer being connected to the input of said line storage member.

References Cited in the file of this patent

UNITED STATES PATENTS

| | | |
|---|---|---|
| 2,487,603 | Scoles | Nov. 8, 1949 |
| 2,590,950 | Eckert | Apr. 1, 1952 |
| 2,600,744 | Eckert | June 17, 1952 |
| 2,609,143 | Stibitz | Sept. 2, 1952 |
| 2,615,127 | Edwards | Oct. 21, 1952 |
| 2,671,607 | Williams et al. | Mar. 9, 1954 |
| 2,712,898 | Knutsen | July 12, 1955 |
| 2,789,759 | Tootill | Apr. 23, 1957 |
| 2,789,760 | Rey | Apr. 23, 1957 |

OTHER REFERENCES

Electronic Engineering, "The Physical Realization of an Electronic Digital Computer," by A. D. Booth; pages 492–498; December 1950.